(12) United States Patent
Wallace et al.

(10) Patent No.: US 7,879,297 B2
(45) Date of Patent: Feb. 1, 2011

(54) METHODS AND SYSTEMS FOR REACTOR LOW PRODUCT VARIATION

(75) Inventors: Paul Steven Wallace, Katy, TX (US); Arnaldo Frydman, Houston, TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/054,190

(22) Filed: Mar. 24, 2008

(65) Prior Publication Data
US 2009/0239959 A1 Sep. 24, 2009

(51) Int. Cl.
*B01J 8/00* (2006.01)
*C07C 27/00* (2006.01)

(52) U.S. Cl. .................. 422/189; 422/190; 422/223; 422/234; 518/702; 518/705; 518/709

(58) Field of Classification Search .................. 422/189, 422/190, 223, 234; 518/702, 705, 709
See application file for complete search history.

(56) References Cited

U.S. PATENT DOCUMENTS

| | | | | |
|---|---|---|---|---|
| 2,447,505 A | * | 8/1948 | Johnson | 518/709 |
| 2,568,953 A | * | 9/1951 | Dickinson et al. | 518/719 |
| 6,306,917 B1 | * | 10/2001 | Bohn et al. | 518/700 |
| 6,544,316 B2 | * | 4/2003 | Baker et al. | 95/55 |
| 6,838,487 B1 | | 1/2005 | Demirel et al. | |
| 6,872,753 B2 | * | 3/2005 | Landis et al. | 518/705 |
| 6,949,488 B2 | | 9/2005 | Belt et al. | |
| 7,001,927 B2 | | 2/2006 | Zhang et al. | |
| 2002/0035163 A1 | | 3/2002 | Vogel et al. | |
| 2003/0125397 A1 | | 7/2003 | Zhang et al. | |
| 2003/0149121 A1 | | 8/2003 | Zhang et al. | |
| 2004/0059009 A1 | | 3/2004 | Belt et al. | |
| 2004/0204508 A1 | | 10/2004 | Zhang et al. | |
| 2005/0154069 A1 | | 7/2005 | Inga et al. | |
| 2005/0196332 A1 | | 9/2005 | Demirel et al. | |
| 2006/0074132 A1 | | 4/2006 | Allam et al. | |
| 2006/0079586 A1 | | 4/2006 | Tavasoli et al. | |

* cited by examiner

*Primary Examiner*—Jennifer A Leung
(74) *Attorney, Agent, or Firm*—Armstrong Teasdale LLP

(57) ABSTRACT

A method of operating a carbon-to-liquids system is provided. The method includes receiving a flow of syngas at the carbon-to-liquids system, shifting the syngas to facilitate increasing a hydrogen to carbon monoxide ratio ($H_2/CO$) of the syngas, adding additional hydrogen to the shifted syngas to increase the $H_2/CO$ ratio, reacting the hydrogen/shifted syngas mixture with a catalyst in a vessel, extracting hydrogen from the syngas mixture, recycling the hydrogen to facilitate increasing the $H_2/CO$ ratio, and recycling naphta to act as solvent for wax extraction, and to facilitate catalyst recovery.

10 Claims, 2 Drawing Sheets

METHODS AND SYSTEMS FOR REACTOR LOW PRODUCT VARIATION

BACKGROUND OF THE INVENTION

This invention relates generally to carbon-to-liquids systems, and more specifically to methods and systems for minimizing liquid product variation from a reactor portion of a system.

The terms C5+ and "liquid hydrocarbons" are used synonymously to refer to hydrocarbons or oxygenated compounds having five (5) or greater number of carbons, including for example pentane, hexane, heptane, pentanol, pentene, and which are liquid at normal atmospheric conditions. The terms C4− and "gaseous hydrocarbons" are used synonymously to refer to hydrocarbons or oxygenated compounds having four (4) or fewer number of carbons, including for example methane, ethane, propane, butane, butanol, butene, propene, and which are gaseous at normal atmospheric conditions.

At least some known Fischer-Tropsch (FT) units have been optimized to produce synthesis gas (syngas) from natural gas, also known as Gas-to-Liquids process (GTL). Typically, syngas refers to a mixture of $H_2$, CO and some $CO_2$ at various proportions. To improve C5+ selectivity and minimize selectivity to C4−, i.e. natural gas and liquefied petroleum gas (LPG) production in known units, a FT reactor is operated with relatively high residence times, with relatively high per pass conversion, and with hydrogen to carbon monoxide ($H_2$/CO) ratios below the consumption ratio. The remote location of most carbon-to-liquids plants makes natural gas and LPG co-production economically unattractive because of the relatively high transportation costs.

Minimizing natural gas and LPG production generally results in a significant fraction (30-40%) of the FT liquids being over-converted to wax. The wax formed must then be converted back to a diesel range, typically C10-C20 hydrocarbons, using a separate hydrocracking reactor. Also, the relatively high per pass conversion that is used to increase C5+ production generally adversely limits the pressure of the FT reactor, and the byproduct water partial pressure increases with conversion and total pressure. As the water partial pressure is increased the catalyst can be generally deactivated through oxidation of the active catalyst sites. Low water partial pressure may cause competitive adsorption of water, CO, and $H_2$ molecules on the catalyst active site, thus reducing syngas conversion. Iron-based FT catalysts in particular can be greatly affected by water. Cobalt-based FT catalysts are generally more resistant to oxidation by water. Other carbonaceous fuels may also be used to provide the syngas input to the FT process. However, undesirable product variations may be caused by the operating characteristics of the known FT gas-to-liquids systems described above.

BRIEF DESCRIPTION OF THE INVENTION

In one aspect, a method of operating a carbon-to-liquids system is provided. The method includes receiving a flow of syngas at the carbon-to-liquids system, shifting the syngas to facilitate increasing a hydrogen to carbon monoxide ratio ($H_2$/CO) of the syngas, adding additional hydrogen to the shifted syngas to increase the $H_2$/CO ratio, reacting the hydrogen/shifted syngas mixture with a catalyst in a vessel, extracting hydrogen from the syngas mixture, and recycling the hydrogen to facilitate increasing the $H_2$/CO ratio.

In another aspect, a carbon-to-liquids system is provided. The system includes a source of syngas and a vessel configured to shift the syngas to increase a hydrogen to carbon monoxide ratio ($H_2$/CO) of the syngas. The vessel is coupled in flow communication with the source of syngas. The system also includes a source of hydrogen gas coupled in flow communication with the shifted syngas. The source of hydrogen is configured to be mixed with the shifted syngas to increase the $H_2$/CO ratio of the shifted syngas. The system also includes a vessel configured to receive the hydrogen gas and shifted syngas mixture. The vessel includes a catalyst configured to facilitate a Fischer-Tropsch synthesis reaction. The system also includes a hydrogen recovery filter coupled in flow communication with the vessel and configured to extract hydrogen from an un-reacted hydrogen/shifted syngas mixture to produce a hydrogen-lean syngas. The extracted hydrogen is injected into the shifted syngas to increase the $H_2$/CO ratio of the shifted syngas.

In a further aspect, a system for generating liquid hydrocarbons from gaseous reactants is provided. The system includes a source of syngas including hydrogen and carbon monoxide in a ratio of between approximately 1.4 and approximately 1.8. The system also includes a shift reactor configured to shift the syngas to increase a hydrogen to carbon monoxide ratio ($H_2$/CO) of the syngas. The shift reactor is coupled in flow communication with the source of syngas. The system also includes a source of hydrogen gas coupled in flow communication with the shifted syngas. The source of hydrogen gas is configured to be mixed with the shifted syngas to increase the $H_2$/CO ratio of the shifted syngas. The system also includes a vessel configured to receive the hydrogen gas and shifted syngas mixture. The vessel includes a catalyst configured to facilitate a Fischer-Tropsch synthesis reaction. The system also includes a hydrogen recovery filter coupled in flow communication with the vessel and configured to extract hydrogen from an un-reacted hydrogen/shifted syngas mixture to produce a hydrogen-lean syngas. The extracted hydrogen is supplied to the shifted syngas to increase the $H_2$/CO ratio of the shifted syngas to between approximately 1.9 and approximately 2.3.

DETAILED DESCRIPTION OF THE INVENTION

Figure 1:
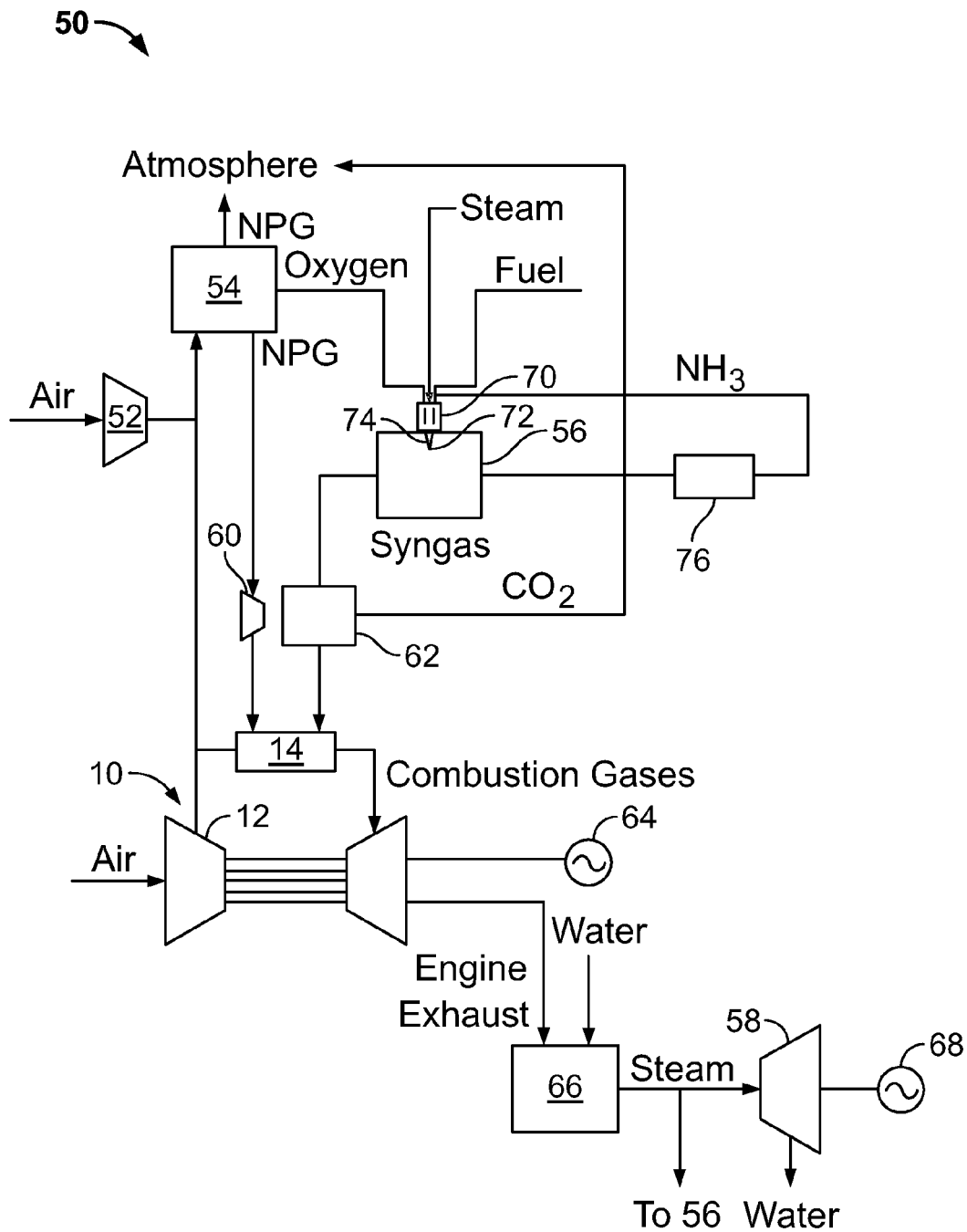
FIG. 1 is a schematic diagram of an exemplary known integrated gasification combined-cycle (IGCC) power generation system.

FIG. 1 is a schematic diagram of an exemplary known integrated gasification combined-cycle (IGCC) power generation system 50. In the exemplary embodiment, IGCC system 50 includes a main air compressor 52, an air separation unit 54 coupled in flow communication to compressor 52, a gasifier 56 coupled in flow communication to air separation unit 54, a gas turbine engine 10 coupled in flow communication to gasifier 56, and a steam turbine 58. In operation, compressor 52 compresses ambient air that is channeled to air separation unit 54. In some embodiments, in addition to or alternatively to, compressor 52, compressed air from gas turbine engine compressor 12 is supplied to air separation unit 54. Air separation unit 54 uses the compressed air to generate oxygen for use by gasifier 56. More specifically, air separation unit 54 separates the compressed air into separate flows of oxygen and a gas by-product, sometimes referred to as a "process gas".

The process gas generated by air separation unit 54 includes nitrogen and will be referred to herein as "nitrogen process gas" (NPG). The nitrogen process gas may also include other gases such as, but not limited to, oxygen and/or argon. For example, in some embodiments, the nitrogen process gas includes between about 95% and about 100% nitrogen. Oxygen flow is channeled to gasifier 56 for use in generating partially combusted gases, referred to herein as "syngas" for use by gas turbine engine 10 as fuel, as described below in more detail. In some known IGCC systems 50, NPG flow from air separation unit 54 is vented to the atmosphere. Moreover, in some known IGCC systems 50, some of the nitrogen process gas flow is injected into a combustion zone (not shown) within gas turbine engine combustor 14 to facilitate controlling emissions of engine 10, and more specifically to facilitate reducing the combustion temperature such that nitrous oxide emissions from engine 10 are reduced. In the exemplary embodiment, IGCC system 50 also includes a compressor 60 for compressing the NPG flow before being injected into the combustion zone.

Gasifier 56 converts a mixture of carbonaceous fuel, oxygen supplied by air separation unit 54, steam, and/or limestone into an output of syngas for use by gas turbine engine 10 as fuel. Although gasifier 56 may use any fuel, in some known IGCC systems 50, gasifier 56 uses coal, petroleum coke, residual oil, oil emulsions, tar sands, and/or other similar fuels. Moreover, in some known IGCC systems 50, syngas generated by gasifier 56 includes carbon dioxide. Accordingly, the syngas generated by gasifier 56 may be cleaned in a clean-up device 62 before being channeled to gas turbine engine combustor 14 for combustion thereof, or alternatively, may be channeled for further processing in other systems, such as, for example, a Fischer-Tropsch synthesis reaction system. In an alternate configuration, at least some portion of cleaned syngas after device 62 may be channeled to gas turbine engine combustor 14, while another portion may be channeled to a FT reaction system (not shown). Carbon dioxide may be separated from the syngas after clean-up and vented to the atmosphere, sequestered for storage, and/or processed for industrial-use gases. In the exemplary embodiment, power output from gas turbine engine 10 drives a generator 64 that supplies electrical power to a power grid (not shown). Specifically, exhaust gas from gas turbine engine 10 is supplied to a heat recovery steam generator 66 that generates steam for driving steam turbine 58. In some known IGCC systems 50, steam from heat recovery steam generator 66 is supplied to gasifier 56 for generating syngas.

In the exemplary embodiment, gasifier 56 includes an injection nozzle 70 that extends through gasifier 56. Injection nozzle 70 includes a nozzle tip 72 at a distal end 74 of injection nozzle 70, and a port (not shown in FIG. 1) that is configured to direct a stream of fluid proximate nozzle tip 72 to facilitate reducing a temperature of at least a portion of nozzle tip 72. In the exemplary embodiment, injection nozzle 70 is configured to direct a stream of ammonia proximate nozzle tip 72 such that the stream of ammonia facilitates reducing a temperature of at least a portion of nozzle tip 72.

In the exemplary embodiment, IGCC system 50 includes a syngas condensate stripper 76 that receives condensate from a stream of syngas discharged from gasifier 56. The condensate typically includes a quantity of ammonia dissolved therein. At least a portion of the dissolved ammonia is formed in gasifier 56 from a combination nitrogen gas and hydrogen in gasifier 56. To remove the dissolved ammonia from the condensate, the condensate is heated to a temperature sufficient to induce boiling. The stripped ammonia is discharged from stripper 76 and returned to gasifier 56 at a pressure that is higher than the operating pressure of the gasifier, wherein the ammonia is decomposed in the relatively high temperature region of the gasifier proximate nozzle tip 72.

Figure 2:
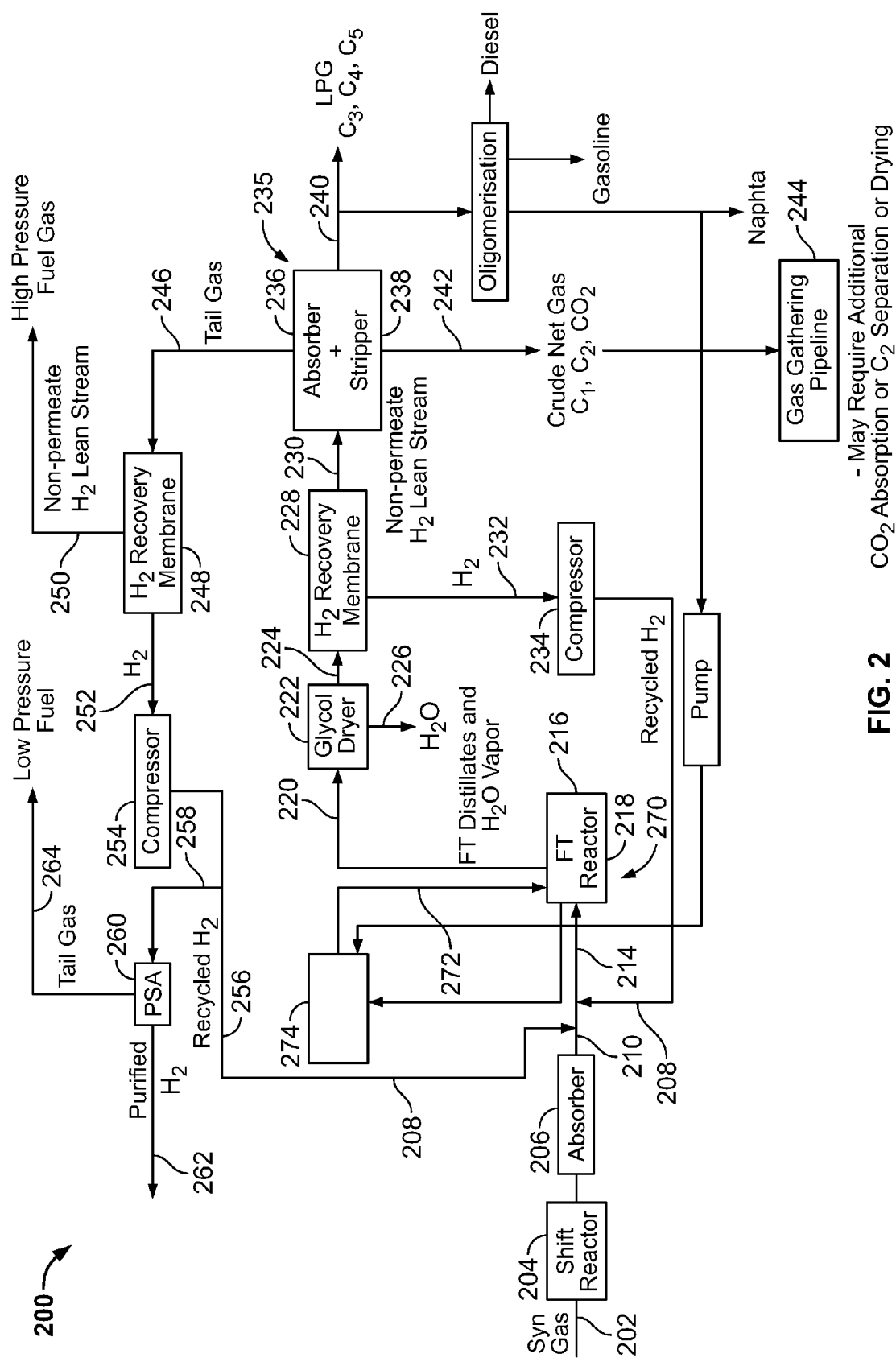
FIG. 2 is a schematic diagram of a portion of an exemplary coal-to-liquids processing system that may be used with the system shown in FIG. 1.

FIG. 2 is a schematic diagram of a portion of an exemplary coal-to-liquids processing system 200. Known commercial gas-to-liquid (GTL) reactors are generally operated at hydrogen to carbon monoxide ratios ($H_2/CO$) of between approximately 1.4 and approximately 1.8 to optimize the C5+ selectivity. Specifically, at least some known commercial reactors are operated at $H_2/CO$ ratios of 1.6. The kinetics of the Fischer-Tropsch (FT) reaction are improved at higher $H_2/CO$ ratios. In the exemplary embodiment, using an $H_2/CO$ ratio of between approximately 1.9 and approximately 2.3 (FT consumption ratio), approximately one third less catalyst and reaction volume are used as compared to operating with an $H_2/CO$ ratio of 1.6. Specifically, in one embodiment, an $H_2/CO$ ratio of approximately 2.10 is utilized.

A flow of syngas 202 from a gasification process such as but, not limited to a coal gasification process, is prepared to an $H_2/CO$ ratio of between approximately 1.7 and approximately 1.95 by shifting at least a portion of syngas in a shift reactor 204, shut that essentially all of the carbon dioxide ($CO_2$), hydrogen sulfide ($H_2S$), and carbonyl sulfide (COS) is removed using, for example, a solvent and absorbent-based system 206. In an exemplary embodiment, the $H_2/CO$ ratio of syngas is shifted to approximately 1.85. Recycled hydrogen from a flow of tail gas 208 increases an $H_2/CO$ ratio of feed gas 210 to produce a mixed feed gas 214 having a $H_2/CO$ ratio of between approximately 1.9 and approximately 2.3. In the exemplary embodiment, the $H_2/CO$ ratio is increased to approximately 2.10.

The flow of mixed feed gas 214 is channeled to a Fischer-Tropsch synthesis reactor 216. In the exemplary embodiment, the Fischer-Tropsch synthesis reactor 216 is a slurry bubble column reactor (SBCR) type. Moreover, in the exemplary embodiment, approximately 40% of the carbon monoxide (CO) and hydrogen ($H_2$) are converted into FT distillates and water in vapor form, and FT wax in liquid form in SBCR 216.

The Fischer-Tropsch reaction for converting syngas, which is composed primarily of carbon monoxide (CO) and hydrogen gas ($H_2$), is characterized by the following general reactions, for producing paraffinic (1) and olefinic hydrocarbons (2):

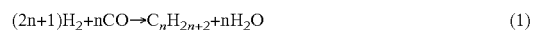

$$(2n+1)H_2 + nCO \rightarrow C_nH_{2n+2} + nH_2O \qquad (1)$$

$$2nH_2 + nCO \rightarrow C_nH_{2n} + nH_2O \qquad (2)$$

Mixed feed gas 214 is fed to SBCR 216 and distributed into a slurry 218 comprising liquid wax and catalyst particles. As the gas bubbles through slurry 218, it is diffused and converted into additional wax during the exothermic FT reaction. The heat generated during the FT reaction is removed through cooling coils which the FT heat recovery system (not shown), wherein steam is generated for use elsewhere in system 200 and/or system 50, including feed to gasifier 56 (FIG. 1) and feed to shift reactor 204 (FIG. 2). SBCR 216 operates at a relatively high pressure of approximately 600 psia, but with a low per pass conversion of approximately 40% such that the water partial pressure is sufficiently low enough (generally under 15-25 volume %, depending on catalyst type) to substantially reduce oxidizing and deactivating the catalyst.

A flow of FT distillates and water vapor 220 are separated in a glycol dryer 222 to produce a flow of dried gas 224 and a flow of aqueous phase 226 (containing water and oxygenated compounds) that is extracted from system 200. In one embodiment, the flow of water 226 is channeled to a stripper (not shown) to separate oxygenates from other organics. The flow of dried gas 224 is filtered through a hydrogen recovery membrane 228. Membrane 228 filters hydrogen from dried gas 224 to produce a non-permeate hydrogen-lean stream 230 and a stream of permeate hydrogen-rich stream 232, which is channeled through a compressor 234 and recycled to the flow of feed gas 210 to produce the mixed feed gas 214 that is supplied to SBCR 216. In another embodiment, stream 226 is channeled to a FT water work-up system (not shown) for separation of alcohols, ketones, aldehydes and acids from the water phase. The latter is channeled to a water purification system and the water product is routed to the FT heat recovery system for additional steam generation and used elsewhere in system 200 and/or system 50, including feed to gasifier 56 (FIG. 1) and feed to shift reactor 204 (FIG. 2).

Non-permeate hydrogen-lean stream 230 is channeled to a refrigerated lean oil system 235, wherein C1, C2, C3, C4, C5, and $CO_2$ components are absorbed from gas 230 using an absorber 236 and a stripper 238. As such, two product fuel streams are produced via system 235. Specifically, a liquefied petroleum gas 240 containing C3, C4, and C5 is extracted from system 235 and at least a portion is stored for commercial use. At least another portion of stream 240 is channeled to an oligomerisation system, which is coupled to a phase separation system, producing naphta and diesel products stored for commercial use. Moreover, a crude natural gas 242 containing C1, C2, and $CO_2$ is also extracted from system 235, and is channeled to a pipeline 244. In one embodiment, crude natural gas 242 is subjected to additional $CO_2$ absorption, $C_2$ separation, and/or drying.

A flow of tail gas 246 from refrigerated lean oil system 235 is filtered through to a second hydrogen recovery membrane 248 to produce a non-permeate hydrogen-lean stream 250 and a permeate hydrogen-rich stream 252. Non-permeate hydrogen-lean stream 250 is extracted from system 200 and used as a high-pressure fuel gas in at least one of a boiler, a fired heater, and/or a combustion turbine. Permeate hydrogen-rich stream 252 is channeled to a compressor 254 and recycled. A first portion (stream 208) of the recycled hydrogen-rich stream 256 is returned to the flow of feed gas 210 to produce the mixed feed gas 214 that is channeled to SBCR 216. A second portion (stream 258) of the recycled hydrogen-rich stream 256 is channeled to a pressure swing adsorption (PSA) 260 to produce purified hydrogen 262. Tail gases 264 from PSA 260 are extracted from system 200 and used as a low-pressure fuel gas in at least one of a boiler, a fired heater, and/or a supplemental heat recovery steam generator firing.

As such, a bubble column reaction section 270 of reactor 216 is operable with a reduced liquid height requirement, and the pump around glycol dryer 222 is operable with a relatively low pressure drop, such that a relatively high recycle gas flow rate is facilitated. Moreover, a relatively high overall conversion of approximately eighty-five per-cent is facilitated while maintaining a relatively low power requirement for recycle compressors 234 and 254. In the exemplary embodiment, the low per pass conversion and high recycle rate enables a lower liquid height of reactor 216, which facilitates a more uniform top-to-bottom gas composition, a more uniform flow distribution with less channeling, a more uniform catalyst distribution, and/or a more uniform temperature profile across reactor 216.

The more uniform operating conditions of FT reactor 216 facilitate reducing FT product variation from the desired kero and diesel range (i.e., C10 to C20). Moreover, wax production is minimized allowing a small base lube oil hydrocracker (pipe reactor) to be added to a return wax stream 272 from an FT catalyst regeneration system 274. At least a portion of the naphta stream produced by the oligomerisation system is pumped to near 600 psia and is then channeled to system 274 for enhancing the performance of catalyst regeneration since, under such conditions, naphta becomes an effective solvent for removal of heavy waxes filling the pores of the catalyst particles. In one embodiment, return wax stream 272 includes un-reacted hydrogen and lighter hydrocarbons that are channeled to an FT distillate stripper (not shown) to separate out lighter components ($H_2$, C1-C4). In such an embodiment, heavier components are fractionated to finished products (including lube oil base stock) in an atmospheric distillation column (not shown).

In one embodiment, a method of operating a carbon-to-liquids system is provided. The method includes receiving a flow of syngas at the carbon-to-liquids system, shifting the syngas to facilitate increasing a hydrogen to carbon monoxide ratio ($H_2/CO$) of the syngas, adding additional hydrogen to the shifted syngas to increase the $H_2/CO$ ratio, reacting the hydrogen/shifted syngas mixture with a catalyst in a vessel, extracting hydrogen from the syngas mixture, and recycling the hydrogen to facilitate increasing the $H_2/CO$ ratio.

Exemplary embodiments of carbon-to-liquids systems and methods of minimizing liquid product variation from the Fischer-Tropsch reactor are described above in detail. The carbon-to-liquids system components illustrated are not limited to the specific embodiments described herein, but rather, components of each system may be utilized independently and separately from other components described herein. For example, the carbon-to-liquids system components described above may also be used in combination with different carbon-to-liquids system components.

The above-described carbon-to-liquids systems and methods are cost-effective and highly reliable. The system and method permit a smaller FT reactor residence time while using a smaller volume of catalyst. Further, the above-described systems and methods increase the reactor per pass conversion, such that a feed syngas $H_2/CO$ ratio is the same as a consumption ratio, to facilitate maintaining the $H_2/CO$ at a stoichiometric ratio even at the outlet. Moreover, the systems and methods produce a higher purity of hydrocarbons having one to five carbons (C1-C5) and a lower total rate of tail gas. In addition, the reactor has increased feed gas purity because a hydrogen-rich stream is extracted through a membrane is recycled back to the reactor. Accordingly, the systems and methods described herein facilitate the operation of carbon to liquids systems in a cost-effective and reliable manner that provides minimal to no losses in product revenue for locations having product pipeline access.

While the invention has been described in terms of various specific embodiments, those skilled in the art will recognize that the invention can be practiced with modification within the spirit and scope of the claims.

What is claimed is:

1. A carbon-to-liquids system comprising:
   a source of syngas;
   a first vessel configured to shift the syngas to increase a hydrogen to carbon monoxide ratio ($H_2/CO$) of the syngas, said first vessel coupled in flow communication with said source of syngas;
   a source of hydrogen gas coupled in flow communication with the shifted syngas, said source of hydrogen configured to be mixed with said shifted syngas to increase the $H_2/CO$ ratio of the shifted syngas;
   a second vessel configured to receive the hydrogen gas and shifted syngas mixture, said second vessel comprising a catalyst configured to facilitate a Fischer-Tropsch synthesis reaction;

a hydrogen recovery filter coupled in flow communication with said second vessel and configured to extract hydrogen from an un-reacted hydrogen/shifted syngas mixture to produce a hydrogen-lean syngas, the extracted hydrogen is injected into the shifted syngas to increase the $H_2/CO$ ratio of the shifted syngas;

a lean oil system comprising an absorber and a stripper, said absorber and said stripper coupled in flow communication with said hydrogen recovery filter to process the hydrogen-lean syngas to produce a crude natural gas, a liquefied petroleum gas, and at least one of a high pressure fuel gas, low pressure fuel gas, and purified hydrogen ($H_2$);

an oligomerisation system coupled in flow communication with said lean oil system to produce naphta; and a catalyst regeneration system coupled in flow communication with said oligomerisation system and said second vessel, said catalyst regeneration system configured to recycle naphta received from said oligomerisation system to facilitate catalyst recovery.

2. A system in accordance with claim 1 wherein said lean oil system is configured to process the hydrogen-lean syngas such that at least one of hydrocarbons containing one to five carbons (C1, C2, C3, C4, C5) and carbon dioxide ($CO_2$) are absorbed.

3. A system in accordance with claim 1 further comprising a gasifier configured to generate a flow of syngas from a carbonaceous fuel.

4. A system in accordance with claim 1 wherein said first vessel produces shifted syngas having an $H_2/CO$ ratio of between approximately 1.9 and approximately 2.3.

5. A system for generating liquid hydrocarbons from gaseous reactants, said system comprises:

a source of syngas comprising hydrogen and carbon monoxide in a ratio of between approximately 1.4 and approximately 1.8;

a shift reactor configured to shift the syngas to increase a hydrogen to carbon monoxide ratio ($H_2/CO$) of the syngas, said shift reactor coupled in flow communication with said source of syngas;

a source of hydrogen gas coupled in flow communication with the shifted syngas, said source of hydrogen gas configured to be mixed with said shifted syngas to increase the $H_2/CO$ ratio of the shifted syngas;

a vessel configured to receive the hydrogen gas and shifted syngas mixture, said vessel comprising a catalyst configured to facilitate a Fischer-Tropsch synthesis reaction;

a hydrogen recovery filter coupled in flow communication with said vessel and configured to extract hydrogen from an un-reacted hydrogen/shifted syngas mixture to produce a hydrogen-lean syngas, the extracted hydrogen supplied to the shifted syngas to increase the $H_2/CO$ ratio of the shifted syngas to between approximately 1.9 and approximately 2.3;

a lean oil system comprising an absorber and a stripper, said absorber and said stripper coupled in flow communication with said hydrogen recovery filter to process the hydrogen-lean syngas to produce a crude natural gas, a liquefied petroleum gas, and at least one of a high pressure fuel gas, low pressure fuel gas, and purified hydrogen ($H_2$);

an oligomerisation system coupled in flow communication with said lean oil system to produce naphta; and a catalyst regeneration system coupled in flow communication with said oligomerisation system and said vessel, said catalyst regeneration system configured to recycle naphta received from said oligomerisation system to facilitate catalyst recovery.

6. A system in accordance with claim 5 wherein said shifted syngas has an $H_2/CO$ ratio of between approximately 1.7 and approximately 1.95.

7. A system in accordance with claim 5 wherein said hydrogen/shifted syngas mixture has an $H_2/CO$ ratio of approximately 2.1.

8. A system in accordance with claim 5 wherein said vessel comprises a slurry bubble column reactor.

9. A system in accordance with claim 5 wherein said lean oil system is configured to process the hydrogen-lean syngas such that at least one of hydrocarbons containing one to five carbons (C1, C2, C3, C4, C5) and carbon dioxide ($CO_2$) are absorbed.

10. A system in accordance with claim 5 wherein said vessel is further configured to maintain a water partial pressure in the vessel below a pre-determined threshold to facilitate reducing oxidization and deactivation of the catalyst.

* * * * *